United States Patent
Renteria et al.

(10) Patent No.: US 6,968,991 B2
(45) Date of Patent: Nov. 29, 2005

(54) DIFFUSION BOND MIXTURE FOR HEALING SINGLE CRYSTAL ALLOYS

(75) Inventors: Federico Renteria, Simpsonville, SC (US); William F Hehmann, Greer, SC (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/190,150

(22) Filed: Jul. 3, 2002

(65) Prior Publication Data

US 2004/0050909 A1 Mar. 18, 2004

(51) Int. Cl.[7] .......................... C22C 19/05; B23K 35/36
(52) U.S. Cl. ............................ 228/262.3; 228/262.31; 420/443; 420/445; 420/448
(58) Field of Search .................. 228/262.3, 262.31; 420/443, 680, 448, 445, 43

(56) References Cited

U.S. PATENT DOCUMENTS

| 4,098,450 A | | 7/1978 | Keller |
|---|---|---|---|
| 4,381,944 A | | 5/1983 | Smith, Jr. |
| 4,478,638 A | | 10/1984 | Smith, Jr. |
| 4,614,296 A | | 9/1986 | Lesgourgues |
| 5,395,584 A | | 3/1995 | Berger |
| 5,437,737 A | * | 8/1995 | Draghi et al. .................. 148/23 |
| 5,666,643 A | | 9/1997 | Chesnes |
| 5,735,448 A | * | 4/1998 | Draghi et al. ................ 228/119 |
| 6,389,669 B1 | * | 5/2002 | Moscone ..................... 29/278 |
| 6,409,795 B2 | * | 6/2002 | Sievers et al. ................ 75/255 |
| 6,624,225 B1 | * | 9/2003 | Ellison et al. ............... 524/434 |

FOREIGN PATENT DOCUMENTS

WO  PCT/US03/20805  4/2004

* cited by examiner

Primary Examiner—Jonathan Johnson
Assistant Examiner—Len Tran
(74) Attorney, Agent, or Firm—Ingrassia Fisher & Lorenz

(57) ABSTRACT

A diffusion bond mixture paint and method for repairing a single-crystal superalloy article that minimizes the amount of braze alloy applied to the article. The amount of boron and eutectic brittle borides of the wide gap brazing processes is minimized, resulting in a more robust repair. The braze paint includes an alloy powder mixture, a binder, and a carrier to thin the paint.

9 Claims, No Drawings

DIFFUSION BOND MIXTURE FOR HEALING SINGLE CRYSTAL ALLOYS

FIELD OF INVENTION

This invention relates to a composition and method for the repair of gas turbine engine components and, more particularly, to a diffusion bond paint mixture and thermal cycle for diffusion bond healing single crystal nickel-base superalloy articles.

BACKGROUND

Nickel-base superalloys are used in gas turbine engine components because of their superior creep strength properties in high temperature operating conditions. While such single-crystal superalloys represent a substantial improvement over other prior known nickel-base superalloys that do not have a directionally oriented microstructure, they represent a compromise with respect to environmental attack during use, particularly to hot corrosion caused by oxidation and sulfidation. Further, despite the increased strength, single-crystal alloys are susceptible to cracks or other types of damage or deterioration that can occur from such experiences from thermal cycling or airborne object impact, or their combinations. Also, discontinuities such as shrinkage, inclusions and cracks can occur during the manufacture of such components. Because of the relatively high cost of such components, it is sometimes desirable to repair rather than to replace them. However, superalloy components, once damaged, can tend to fail repeatedly in the same region, making it critical that any repairs made have mechanical, environmental, and processing properties equivalent to or better than the original superalloy base metal.

Methods are known in the art to repair certain nickel-base superalloys, such as wide-gap brazing or transient-liquid phase processes. These processes involve cleaning the turbine engine component, applying a compatible diffusion bond mixture having a melting temperature lower than that of the substrate, and heating the article to melt the diffusion bond mixture without causing thermal damage to the substrate. Most of these processes are used on equiaxed alloys, but it has been found to be more difficult to repair single-crystal alloys because introduction of impurities to the unicrystal can create points of weakness.

Repair diffusion bond mixtures have been formulated to include substantial amounts of melting point depressants, primarily silicon and boron, so that the diffusion bond mixture can be applied at temperatures that are sufficiently high to melt the mixture, but not high enough to melt the substrate and cause thermal damage to the substrate. Because the amount of melting point depressants is so high, however, the diffusion bond mixture may differ significantly in composition from the substrate and the repaired area may not have the same properties as the adjacent substrate, increasing the risk of failure at the repaired area. In particular, undesirable large blocky or script-like brittle phases composed of chromium, titanium, and the family of refractory elements (e.g., tungsten, tantalum) combined with the melting point depressants grow in the eutectic that forms between the substrate and the diffusion bond mixture. These brittle phases may weaken the repair composite. It should be appreciated, however, that conventional repairs generally result in safe end products when properly used.

Therefore, there is a need for a composition and method that minimizes the amount of diffusion bond mixture alloy applied to the part, and therefore the amount of boron. There is also need for a composition and method that minimizes eutectic brittle borides common to wide gap brazing processes and a composition and method to repair superalloy substrates that results in a repaired area that has properties very similar to the substrate.

SUMMARY OF THE INVENTION

The present invention is diffusion bond mixture paint used to repair single-crystal superalloy articles which minimizes the amount of diffusion bond mixture alloy applied to the article. The paint has of a two-alloy powder mixture, a binder, and a carrier which also serves to thin the paint. The powder mixture has a higher-melting temperature powder and a lower-melting temperature powder that cooperate to let the diffusion bond mixture melt and flow into the cracks, then allows the melting point depressants to diffuse into the substrate, and the resulting higher-melting temperature components to harden. The diffusion bond mixture paint is applied to a clean superalloy article and the article is heated through a three-step thermal cycle. The thermal cycle allows the paint to melt and flow into the damaged areas, then cool to wait for thermocouple stabilization and diffuse into the substrate. Other independent features and advantages of the preferred mixture composition and method will become apparent from the following detailed description, taken in conjunction with the accompanying drawings which illustrate, by way of example, the principles of the invention.

DETAILED DESCRIPTION OF THE INVENTION

The present invention is embodied in a diffusion bond mixture paint having a two-alloy powder mixture, a binder, and a carrier. Table 1 summarizes the composition of the diffusion bond mixture paint, wherein the powder mixture is combined with about 10% binder and about 5–20% carrier, by weight percentage. Example 1 illustrates a paint wherein 100 grams of the powder mixture is mixed with 10 grams of binder and 5 grams of carrier. Example 2 illustrates a paint wherein 100 grams of the powder mixture is mixed with 10 grams of binder and 20 grams of carrier.

TABLE 1

Composition of the Diffusion bond mixture Paint

| Component | Relative Quantity (wt %) | Example 1 | Example 2 |
| --- | --- | --- | --- |
| Powder mixture | 100 | 100 grams | 100 grams |
| Binder | 5–15 | 10 grams | 10 grams |
| Carrier | 5–20 | 5 grams | 20 grams |

The powder mixture contains a higher-melting temperature alloy powder and a lower-melting temperature alloy powder. In combination the two powders define a homogenous powder system. The high-melt alloy powder, which has superior hot corrosion resistance along with good oxidation resistance and mechanical properties, is further characterized by the substantial absence of melting point depressant elements such as Si or B. The low-melt alloy powder, in contrast, contains melting point depressant elements Si, B, or both. In practice, the powders may also contain incidental impurities. The preferred high-melt alloys are MAR-M 247 and MAR-M 509. The preferred low-melt alloys are M3877 and MAR-M 509B. Table 2 lists the preferred powders and the amounts of each constituent component of each powder, by weight percentage.

TABLE 2

Powder Alloy Compositions by wt %

|    | Higher Melting Point Components | | Lower Melting Point Components | |
| --- | --- | --- | --- | --- |
|    | MAR-M 247 | MAR-M 509 | M3877 | MAR-M 509B |
| Ni | 60   | 10   | 82.1 | 10   |
| W  | 10   | 7    | —    | 7    |
| Co | 10   | 55   | —    | 51.5 |
| Cr | 8.3  | 23.5 | 15.0 | 23.4 |
| Al | 5.5  | —    | —    | —    |
| Ti | 1    | 0.2  | —    | 0.2  |
| Ta | 3    | 3.5  | —    | 3.5  |
| Zr | 0.1  | 0.5  | —    | 0.5  |
| Mo | 0.7  | —    | —    | —    |
| C  | 0.1  | 0.6  | —    | 0.6  |
| Fe | —    | —    | —    | —    |
| Hf | 1.5  | —    | —    | —    |
| B  | 0    | 0    | 3.5  | 2.9  |
| Si | 0    | 0    | 0    | 0.4  |

The preferred powders are combined in preferred ratios as shown in Table 3. The first preferred powder mixture, known by the brand name JetFix E, is a combination of about 49–51% MAR-M 247 and 49–51% M3877. The second preferred powder mixture, known by the brand name JetFix G, is a combination of about 59–61% MAR-M 247 and 39–41% M3877. The third preferred powder mixture, known by the brand name JetFix 555, is a combination of about 49–51% MAR-M 509 and 49–51% MAR-M 509B. The paints made from these powder mixtures have been used to repair MAR-M509 shrouds and CMSX-3 airfoils, among other gas turbine engine components.

TABLE 3

Preferred Ratios of Alloy Powders

|    | Higher Melting Point Components | | Lower Melting Point Components | |
| --- | --- | --- | --- | --- |
|    | MAR-M 247 | MAR-M 509 | M3877 | MAR-M 509B |
| JetFix E   | 49–51% | —      | 49–51% | —      |
| JetFix G   | 59–61% | —      | 39–41% | —      |
| JetFix 555 | —      | 49–51% | —      | 49–51% |

The powder mixtures are mixed with a binder and a carrier. The binder is preferably AB215, a non-fibrous binder known in the art, which is commercially available from Metal Methods, Inc., Frankfurt, Ky. The carrier is typically an alcohol that evaporates at a temperature below the melting point of the powder mixture, such as ethyl alcohol or acetone, and is preferably isopropanol. A purpose of the carrier is to thin, or reduce the viscosity, of the paint. This enables a very thin layer of paint to be applied to the substrate so as to reduce the amount of borides applied to the crack, thereby minimizing the eutectic brittle borides that may form. Ideally just enough of the paint is applied to supply the appropriate amount of the powder mixture to heal the crack, but no more, thus reducing the brittle borides to a minimum. The resultant composition is a diffusion bond mixture paint that is applied to the superalloy articles with a paintbrush or sprayer.

To repair the damaged substrate, the articles are first prepared for repair by a process known in the art. The articles are stripped of all the aluminide coating by acid stripping. Cracks are identified with visual inspection using a magnifier. Cracks greater than about 0.02" are closed and physically restrained with a clamp. Cracks are then welded together using spot welds. After the initial preparation, the cracks are then cleaned with a fluoride-ion cleaning process, which is also known in the art. Pursuant to the present invention, the selected diffusion bond mixture paint is applied to the crack with a paint brush or sprayer in a thin layer, thereby limiting the amount of borides applied to the article. The article is then placed in a vacuum and heated at 2200° F.±15° F. for 10–20 minutes to let the diffusion bond mixture melt and flow into the cracks. The article is then cooled to a minimum of 1500° F.±15° F. until thermocouple stabilization occurs. The article is then reheated at 2200° F.±15° F. for 4 hours and 15 minutes±15 minutes to allow the melting point depressants to diffuse into the substrate. This diffusion results in a stronger repair that is less susceptible to incipient melting when the part is returned to service. The three-step thermal cycle allows the paint to melt and flow into the damaged areas, then provides for thermocouple stabilization and finally diffusion into the substrate.

While what has been described is considered to be the best mode contemplated for carrying out the present invention and its preferred embodiments, it will be understood by those skilled in the art that various changes and modifications may be made, and equivalents may be substituted for elements thereof without departing from the true scope of the invention. Therefore, it is intended that this invention not be limited to the particular embodiments disclosed but that the invention will include all embodiments falling within the scope of the appended claims.

What is claimed is:

1. A diffusion bond mixture comprising:
   a) an alloy powder mixture comprising:
      i) a first alloy powder having a first melting temperature; and
      ii) a second alloy powder having a second melting temperature lower than the melting temperature of the first alloy powder,
   b) a binder, wherein the binder comprises, by weight, between about 7–15% of the mixture; and
   c) a carrier, wherein the carrier comprises, by weight, between about 5–20% of the mixture.

2. The mixture of claim 1 wherein:
   a) the first alloy powder consists essentially of, by weight, 10% W, 10% Co, 8.3% Cr, 5.5% Al, 1.0% Ti, 3.0% Ta, 1.5% Hf, 0.1% Zr, 0.70% Mo, 0.1% C with the balance consisting of Ni and incidental impurities;
   b) the second alloy powder consists essentially of, by weight, about 15% Cr, 2.9% B and with the balance consisting of Ni and incidental impurities; and
   c) the alloy powder mixture is, by weight percent, 49–51% of the first alloy powder and 49–51% of the second alloy powder.

3. The mixture of claim 1 wherein:
   a) the first alloy powder consists essentially of, by weight, 10% W, 10% Co, 8.3% Cr, 5.5% Al, 1.0% Ti, 3.0% Ta, 1.5% Hf, 0.1% Zr, 0.70% Mo, 0.1% C with the balance consisting of Ni and incidental impurities;
   b) the second alloy powder consists essentially of, by weight, about 15% Cr, 2.9% B and with the balance consisting of Ni and incidental impurities; and
   c) the alloy powder mixture is, by weight percent 59–61% of the first alloy powder and 39–41% of the second alloy powder.

4. The mixture of claim 1 wherein:
   a) the first alloy powder consists essentially of, by weight, 7% W, 10% Ni, 23.5% Cr, 0.2% Ti, 3.5% Ta, 0.35% Zr, and 0.6% C, with the balance consisting of Co and incidental impurities;

b) the second alloy powder consists essentially of, by weight, 7% W, 10% Ni, 23.5% Cr, 0.2% Ti, 3.5% Ta, 0.35% Zr, 0.6% C, and 2.9% B with the balance consisting of Co and incidental impurities; and C) the alloy powder mixture is, by weight percent, 59–61% of the first alloy powder and 39–41% of the second alloy powder.

5. The mixture of claim 1 wherein the binder comprises a non-fibrous material.

6. The mixture of claim 1 wherein the carrier is isopropanol.

7. The mixture of claim 1 wherein:

a) the alloy powder mixture consists essentially of, by weight, 35–65% of the first alloy powder and 35–65% of the second alloy powder;

b) the binder comprises, by weight, 10% of the mixture; and a) the carrier comprises, by weight, 20% of the mixture.

8. The mixture of claim 1 wherein:

a) the alloy powder mixture consists essentially of by weight 59–61% of the first alloy powder and 59–61% of the second alloy powder, b) the binder comprises, by weight, 10% of the mixture; and c) the carrier comprises, by weight 20% of the mixture.

9. The diffusion bond mixture of claim 1, wherein the binder comprises, by weight, between about 8–15% of the mixture.

* * * * *